United States Patent
Martin et al.

(10) Patent No.: US 8,234,187 B1
(45) Date of Patent: Jul. 31, 2012

(54) EMPLOYER AGENCY ENROLLMENT

(75) Inventors: Jennifer A. Martin, Los Altos, CA (US); Arun Varshney, Sunnyvale, CA (US); Jeff A. Zias, Los Altos, CA (US)

(73) Assignee: Intuit Inc., Mountain View, CA (US)

( * ) Notice: Subject to any disclaimer, the term of this patent is extended or adjusted under 35 U.S.C. 154(b) by 696 days.

(21) Appl. No.: 11/700,466

(22) Filed: Jan. 30, 2007

(51) Int. Cl.
*G07B 17/00* (2006.01)
*G06Q 10/00* (2012.01)
*G06Q 40/00* (2012.01)

(52) U.S. Cl. .............................. 705/30; 705/320; 705/44

(58) Field of Classification Search .................. 705/30
See application file for complete search history.

(56) References Cited

U.S. PATENT DOCUMENTS

| 7,194,426 B1* | 3/2007 | Box .............................. 705/26 |
| 2003/0216978 A1* | 11/2003 | Sweeney et al. ................. 705/30 |

\* cited by examiner

*Primary Examiner* — Fahd Obeid
(74) *Attorney, Agent, or Firm* — Osha Liang LLP (57) ABSTRACT

A computer-implemented method for enrolling an employer with an agency. The method includes obtaining employer data from the employer, evaluating a requirement to enroll with the agency based on the employer data, accessing a customized interface associated with the agency based on the requirement, transmitting the employer data to the customized interface, and receiving an employer enrollment credential from the agency to confirm enrollment with the agency.

24 Claims, 3 Drawing Sheets

EMPLOYER AGENCY ENROLLMENT

BACKGROUND

Payroll is generally considered a series of accounting transactions centered around making payments to employees for services rendered. In addition to calculating a basic hourly wage or salary for an employee, an employer calculates as gross pay any commission, bonuses, vacation pay, sick leave, or other compensation. The employer is also responsible for withholding various debits from the employee's gross pay, including income tax, other taxes (such as social security and Medicare), health insurance, union dues, pension plan contributions, and other deductions.

After the appropriate deductions are removed from the gross pay, the employee is paid the remaining amount, known as net pay. The net pay is typically disbursed to the employee in the form of cash, a handwritten check, a printed check, as a direct deposit into the employee's bank account, or some other form of electronic transfer. Along with the disbursement of payment, the employee may receive a pay stub detailing the gross income as well as the deductions for the current pay period. The pay stub may also include year-to-date totals for important items on the paycheck, such as gross pay, income tax withholding, social security withholding, Medicare withholding, deductions, and other details.

In addition to calculating and paying employees' net income, the employer is also responsible for transferring deducted amounts from employee paychecks, as well as making additional monetary contributions, to the appropriate organizational (i.e., governmental) bodies. For example, the employer must send portions of the employee's withholdings and any employer matching contributions to: (1) the Internal Revenue Service (IRS) and state agencies as tax payments, (2) the insurance plan administrator for the group health care plan to which the employer is enrolled as health insurance payments, (3) any retirement plans, such as 401k plans, offered by the employer (including matching funds) as funding payments, and (4) any other entity for payment of any additional expenses.

In order to perform certain functions, such as electronic filing and payment of taxes, electronic payment of insurance fees, electronic payment of association fees and dues, and other business-related transactions, the employer must enroll with one or more organizational and/or governmental bodies. For example, an employer must enroll with the IRS for electronic filing of tax returns, with the Electronic Federal Tax Payment System (EFTPS) for electronic payment of taxes, and sometimes with one or more state tax agencies for electronic filing and electronic payment of state taxes. In addition, enrollment for electronic filing and electronic payment at a particular tax agency is often separate. Consequently, the employer may repeat the enrollment process at multiple agencies in order to access certain functionalities of the agencies, such as electronic filing and payment.

SUMMARY

In general, in one aspect, the invention relates to a computer implemented method for enrolling an employer with an agency. The computer implemented method includes obtaining employer data from the employer, evaluating a requirement to enroll with the agency based on the employer data, accessing a customized interface associated with the agency based on the requirement, transmitting the employer data to the customized interface, and receiving an employer enrollment credential from the agency to confirm enrollment with the agency.

In general, in one aspect, the invention relates to a system for enrolling an employer with an agency using a customized interface. The system includes a business management system, including: an employer data repository configured to store employer data, an identity management system in communication with the employer data repository and configured to: access the customized interface, transmit the employer data to the customized interface, and receive an employer enrollment credential from the agency to confirm enrollment with the agency, and an employer interface configured to allow the employer to access the business management system.

In general, in one aspect, the invention relates to a computer readable medium containing software instructions embodied therein for causing a computer system to perform a method for enrolling an employer with an agency. The method includes obtaining employer data from the employer, evaluating a requirement to enroll with the agency based on the employer data, accessing a customized interface based on the requirement, transmitting the employer data to the customized interface, and receiving an employer enrollment credential from the agency to confirm enrollment with the agency.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to enroll an employer with an agency. The employer may be an individual owner, partnership, corporation, association, a public entity, a nonprofit organization, or other form of business entity. An agency may be a federal tax agency, state tax agency, local tax agency, insurance company, social security agency, professional organization, or other entity associated with the employer's business.

Specifically, embodiments of the invention provide a computer-implemented method and apparatus to automate the enrollment of an employer with one or more agencies. Embodiments of the invention allow an employer to provide data about his/her business. The employer's data and preferences, as well as a set of enrollment rules, is used to enroll the employer in the agency or agencies. The employer's data and enrollment rules may also be used to determine any agencies with which the employer is required to enroll. Further, the employer may only need to enter data once in order to enroll with multiple agencies.

Figure 1:
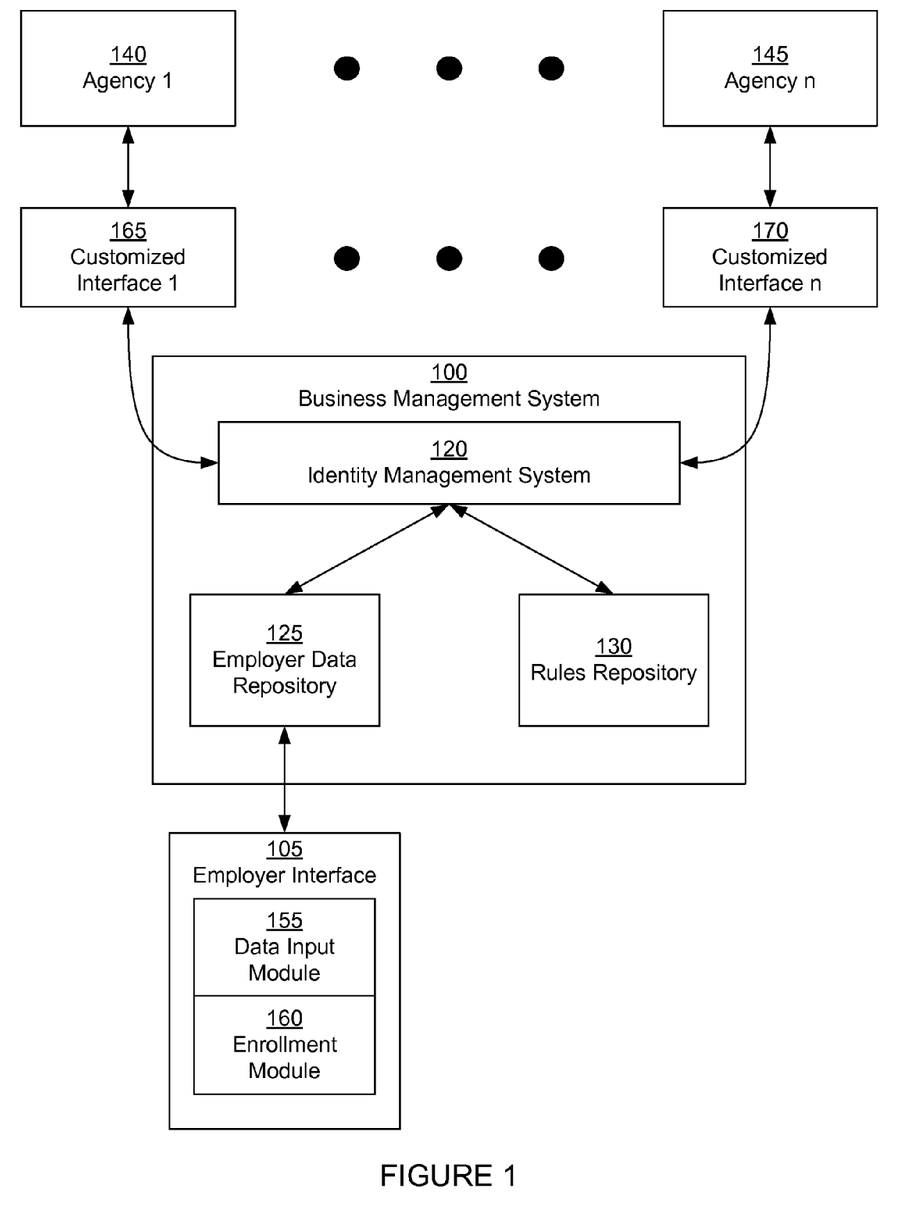
FIG. 1 shows a schematic diagram of a system in accordance with one or more embodiments of the invention.

FIG. 1 shows a schematic diagram of a system in accordance with one or more embodiments of the invention. As shown in FIG. 1, the system includes a business management system (100), multiple agencies (e.g., agency 1 (140), agency n (145)), multiple customized interfaces (e.g., customized interface 1 (165), customized interface n (170)), and an employer interface (105). Each of these components is described below.

The business management system (100) provides business-related services to users through one or more interfaces (e.g., employer interface (105)). The interfaces allow the user of the services to interact with various components of the business management system (100) using a user-friendly environment (e.g., a graphical user interface). Further, because of the sensitive nature of business-related information, these interfaces are often secure connections employing various known techniques for keeping sensitive information secure. In one or more embodiments of the invention, the business management system (100) provides financial, payroll, and/or accounting services to users of the business management system (100). In one or more embodiments of the invention, certain users of the business management system (100), such as accountants and tax attorneys, may provide financial, payroll, and/or accounting to other users of the business management system (100).

In one or more embodiments of the invention, the business management system (100) is implemented using a client-server architecture. The business management system (100) itself may be an enterprise application running on one or more servers, and in some embodiments could be a peer to peer system, or resident upon a single computing system. In addition, the business management system (100) is accessible from other machines using interfaces, such as the employer interface (105) or customized interfaces (e.g., customized interface 1 (165), customized interface n (170)). In one or more embodiments of the invention, the employer interface (105) includes one or more web pages that can be reached from a computer with a web browser and internet connection. Alternatively, the employer interface (105) may be an application that resides on computing systems, which may include personal computers (PCs), mobile phones, personal digital assistants (PDAs), and other digital computing devices of the users, and that communicate with the business management system (100) through one or more network connections and protocols. Regardless of the architecture of the system, communications between the business management system (100) and the employer interface (105) may be secure, as described above.

The business management system (100) also includes an employer data repository (125), rules repository (130), and identity management system (120). The employer data repository (125) includes data about employers in the business management system (100). For example, for each employer in the business management system (100), the employer data repository (125) may include an entry with information such as business name, employer identification number (EIN), number of employees, a list of employees and their wages, the corporate income tax rate of the business, deductions of the business, the business's organization type, the employer type, an employer account number, an unemployment insurance rate, a bank account number, a bank account type, a routing transit number (RTN), a contact name, a contact address, a contact phone number, the employer's industry activity, and/or other information relevant to the business and its accounting and payroll practices. By accessing the employer interface (105), an employer is able to enroll in the business management system (100) and add, update, or delete information in the employer data repository (125). For example, an employer may choose to add a new bank account, delete an existing bank account, add a new employee, remove an employee's records after he/she has left the company, or update the number of employees in the company after personnel changes.

The rules repository (130) may store a set of rules for calculating accounting and payroll figures for employers in the business management system (100). In one or more embodiments of the invention, the rules repository (130) includes a set of current enrollment rules. The enrollment rules may be used by the business management system (100) to determine enrollment procedures for the employer at one or more agencies (e.g., agency 1 (140), agency n (145)). The enrollment rules may also be used to determine the employer's eligibility for enrollment at one or more agencies (e.g., agency 1 (140), agency n (145)). In one or more embodiments of the invention, the rules repository (130) is automatically updated when changes to one or more enrollment rules are made. For example, a change in enrollment procedures may be announced at a governmental agency (e.g., agency 1 (140), agency n (145)) that is connected, either directly or indirectly, to the business management system (100). The business management system (100) may receive the change using a push from the agency (e.g., agency 1 (140), agency n (145)) server, or the business management system (100) may pull the change by sending a query to the agency server.

In one or more embodiments of the invention, a push from an agency (e.g., agency 1 (140), agency n (145)) server corresponds to a transmission of data from the agency server to the business management system (100) at the discretion of the agency server. For example, an agency (e.g., agency 1 (140), agency n (145)) may automatically transmit, or push, any enrollment rule changes to the business management system (100) once the changes have been made to one or more repositories in the agency.

In one or more embodiments of the invention, a pull by the business management system (100) corresponds to a request for data from an agency (e.g., agency 1 (140), agency n (145)) server by the business management system (100). For example, the business management system (100) may request, or pull, a new set of rules from an agency (e.g., agency 1 (140), agency n (145)) every 24 hours.

The rules repository (130) may store the rules as inference rules in a knowledge base. On the other hand, the rules repository (130) may simply store the rules in text form to be analyzed and applied by another application, such as the identity management system (120), or by a user such as the employer or an accountant on the business management system (100).

In one or more embodiments of the invention, the employer data repository (125) and rules repository (130) are stored in one or more databases, which may be flat, hierarchical, network based, relational, dimensional, object modeled, or structured otherwise. For example, each repository (e.g., employer data repository (125), rules repository (130)) may be maintained in a table of a SQL database. In addition, data in each repository (e.g., employer data repository (125), rules repository (130)) may be verified against data stored in the other repository. As mentioned above, data in the rules repository (130) may be used to determine certain field values in the employer data repository (125), such as agencies (e.g., agency 1 (140), agency n (145)) with which the employer is eligible to enroll and/or required to enroll. The fields in the employer data repository (125) may also contain a reference to the rule or rules used to obtain the field values.

While the invention has been described with separate data repositories (i.e., employer data repository (125), rules repository (130)), one skilled in the art will appreciate that a single data repository may be used to hold all data associated with the business management system (100). Likewise, while the data repositories (i.e., employer data repository (125), rules repository (130)) might each be separate, a single database may hold all data repositories or various combinations thereof. Further, the data repository (i.e., employer data repository (125), rules repository (130)) may take the form of any acceptable data storage mechanism to store and retrieve payroll data and rules. Even further, a data repository (i.e., employer data repository (125), rules repository (130)) used with a business management system (100) often includes data protection and security schemes to protect sensitive data from corruption, theft, attack, destruction, and other forms of intrusion and loss of integrity.

In one or more embodiments of the invention, the identity management system (120) is responsible for synchronizing data in one repository (e.g., employer data repository (125), rules repository (130)) with data in the other repository. For example, the identity management system (120) may update field values in the employer data repository (125) upon receiving enrollment rule changes in the rules repository (130). The identity management system (120) may form a part of the relational database containing the repositories (e.g., employer data repository (125), rules repository (130)), or the identity management system (120) may be a standalone application or a separate part of the business management system (100). Aside from synchronizing the repositories (e.g., employer data repository (125), rules repository (130)) in the business management system (100), the identity management system (120) also performs data transfer between the repositories and one or more agencies (e.g. agency 1 (140), agency n (145)) outside the business management system (100).

In one or more embodiments of the invention, an agency (e.g. agency 1 (140), agency n (145)) is a third party organization that stores payroll and/or business data about employers in the business management system (100). An agency (e.g. agency 1 (140), agency n (145)) may also store rules about payroll transactions and enrollment with the agency. Examples of agencies (e.g. agency 1 (140), agency n (145)) include federal tax agencies, state tax agencies, local tax agencies, insurance companies, retirement plans, social security agencies, professional organizations (e.g., American Bar Association, American Medical Association, American Institute of Certified Public Accountants, etc.), and/or other employment-related organizations with records of the employer. Because the agencies (e.g. agency 1 (140), agency n (145)) are not a part of the business management system (100), the business management system (100) interfaces with each agency to transmit and receive data regarding employers in the business management system (100).

In one or more embodiments of the invention, the business management system (100) must transmit specific data about an employer in a certain format in the business management system (100) to an agency (e.g. agency 1 (140), agency n (145)) in order to enroll the employer with the agency. For example, to enroll the employer with the Electronic Federal Tax Payment System (EFTPS), the business management system (100) may have to transmit the employer's Employer Identification Number (EIN), an account number of the employer's financial institution (e.g., a bank), the employer's account type in the financial institution, and the financial institution's Routing Transit Number (RTN).

Those skilled in the art will appreciate that each agency (e.g. agency 1 (140), agency n (145)) may have its own internal representation of records pertaining to an employer. For example, one agency (e.g. agency 1 (140), agency n (145)) may use Extensible Markup Language (XML) to store information about an employer, whereas another agency may use Lightweight Directory Access Protocol (LDAP). In addition, agencies (e.g. agency 1 (140), agency n (145)) that use the same protocol may have different fields corresponding to the same piece of data, such as a person's last name. As a result, the identity management system (120) may communicate with agencies (e.g. agency 1 (140), agency n (145)) through multiple interfaces.

In one or more embodiments of the invention, a customized interface (e.g., customized interface 1 (165), customized interface n (170)) between the business management system (100) and each agency (e.g. agency 1 (140), agency n (145)) is created by the identity management system (120). The customized interface (e.g., customized interface 1 (165), customized interface n (170)) may include a mapping of relevant fields in the data repositories (e.g., employer data repository (125), rules repository (130)) of the business management system (100) and any employer-entered data to any repositories of the agency (e.g. agency 1 (140), agency n (145)). In one or more embodiments of the invention, the customized interface (e.g., customized interface 1 (165), customized interface n (170)) is a web services interface. In one or more embodiments of the invention, the identity management system (120) uses a customized interface (e.g., customized interface 1 (165), customized interface n (170)) with an agency (e.g. agency 1 (140), agency n (145)) to transmit and receive data, such as employer information, enrollment rules, enrollment confirmations, enrollment credentials, etc.

In one or more embodiments of the invention, the identity management system (120) uses employer data stored in the employer data repository (125) to enroll with an agency (e.g. agency 1 (140), agency n (145)) using the customized interface (e.g., customized interface 1 (165), customized interface n (170)) with the agency. In one or more embodiments of the invention, the identity management system (120) uses the customized interfaces (e.g., customized interface 1 (165), customized interface n (170)) to transmit data required for enrollment, receive enrollment confirmations, and/or receive enrollment credentials for the employer. Employer data for enrollment in an agency (e.g. agency 1 (140), agency n (145)) may include the employer name, an employer social security number, a business name, a business location, the employer's EIN, the number of employees employed by the employer, one or more employee social security numbers, an organization type, an employer type, an employer account number, an unemployment insurance rate, a bank account number, a bank account type, a financial institution's RTN, a contact name, a contact address, a contact phone number, and an industry activity.

As mentioned previously, the employer interface (105) allows the employer to access the business management system (100). In addition, the employer interface (105) may include a data input module (155) and an enrollment module (160).

In one or more embodiments of the invention, the data input module (155) allows an employer to enter data about his/her business. For example, the data input module (155) may be structured as a set of forms with fields for entering information. Additionally, the data input module (155) may allow the employer to upload one or more documents, such as word processing documents, spreadsheets, etc., containing payroll and accounting data about the employer. These documents may include the employer's tax returns (e.g., payroll tax return, wage reports/filings, unemployment insurance reports/filings, worker's compensation reports/filings, etc.), bank statements, certifications and licenses, accounting records, human resources records, or other documents related to the employer's business and finances. In one or more embodiments of the invention, data entered into the data input module (155) is stored into one or more entries corresponding to the employer in the employer data repository (125).

The enrollment module (160) allows the employer to enroll with one or more agencies (e.g. agency 1 (140), agency n (145)) using the data entered in the data input module (155). The enrollment module (160) may display a list of agencies (e.g. agency 1 (140), agency n (145)) the employer is eligible to enroll with. In addition, the enrollment module (160) may display a list of agencies (e.g. agency 1 (140), agency n (145)) the employer is required to enroll with. For example, if the employer's business includes assets of $50 million or more and files 250 returns or more annually, the employer may be required to file his/her payroll taxes electronically. As a result, the employer may be required by law to enroll in electronic filing of his/her payroll taxes. This requirement may be displayed in the enrollment module (160) when the employer accesses the enrollment module (160). In one or more embodiments of the invention, enrollment rules in the rules repository (130) are used to determine the agencies (e.g. agency 1 (140), agency n (145)) the employer is required to enroll with, as well as the agencies the employer is eligible to enroll with. In one or more embodiments of the invention, the employer is able to specify the particular agencies (e.g. agency 1 (140), agency n (145)) to enroll with using the enrollment module (160). For example, the employer may place a checkbox next to each agency (e.g. agency 1 (140), agency n (145)) he/she would like to enroll with in the enrollment module (160).

Those skilled in the art will appreciate that an employer may enroll multiple times with an agency (e.g. agency 1 (140), agency n (145)) to enable different functionalities with the agency. For example, an employer may choose to both electronically file a California tax return and electronically pay taxes associated with the California tax return. However, the employer must enroll once with California's Employment Development Department (EDD) to enable electronic filing, and a second time with the EDD to enable electronic payment. The employer may also enroll in electronic payment multiple times to register multiple bank accounts. In addition, the EDD may require different sets of information for electronic filing enrollment and electronic payment enrollment. As a result, the identity management system (120) may send different sets of data for enrolling the employer in different features of an agency (e.g. agency 1 (140), agency n (145)).

On the other hand, the identity management system (120) may send the same data to enroll the employer with different agencies. For example, a state tax agency and local tax agency may require the same information about an employer in order to enroll the employer. Once the employer has entered the information into the business management system (100) through the data input module (155), the identity management system (120) is able to transmit the information to each agency (e.g. agency 1 (140), agency n (145)) and enroll the employer with each agency without further action on the employer's part. In other words, the employer does not need to enter the same information multiple times and at multiple locations to enroll with multiple agencies (e.g. agency 1 (140), agency n (145)), nor does the employer need to manually determine with what agencies he/she is required or eligible to enroll.

Figure 2:
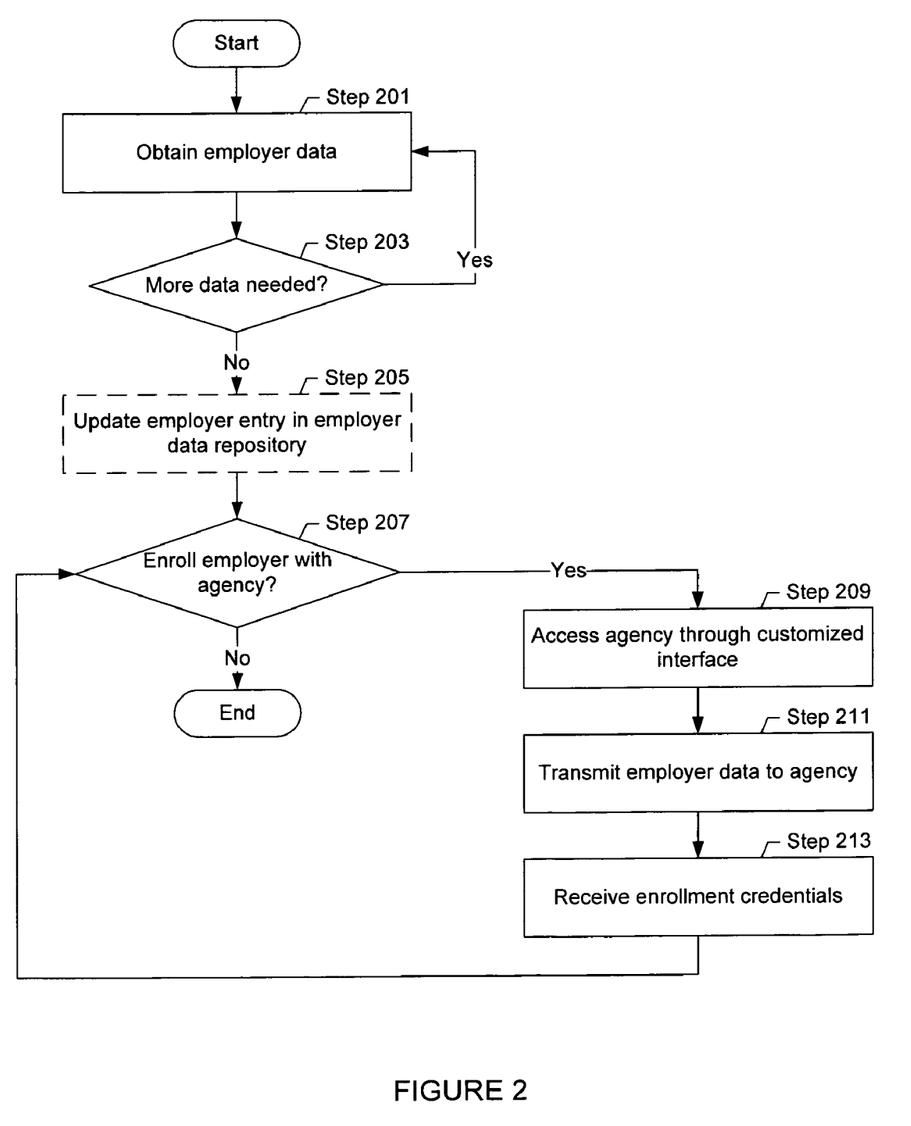
FIG. 2 shows a flow diagram in accordance with one or more embodiments of the invention.

FIG. 2 shows a flow diagram of employer enrollment in accordance with one or more embodiments of the invention. In one or more embodiments of the invention, one or more of the steps described below may be omitted, repeated, and/or performed in a different order. Accordingly, the specific arrangement of steps shown in FIG. 2 should not be construed as limiting the scope of the invention.

Initially, employer data is obtained (Step 201). In one or more embodiments of the invention, employer data is obtained by the data input module of FIG. 1. The employer may provide data by manually entering the data into form fields and/or by uploading one or more business-related documents, as described above. Employer data may include the employer's EIN, business name, employee roster, employee social security numbers, tax rates, current and historical payroll data, the employer's organization type, the employer type, an employer account number, an unemployment insurance rate, a bank account number, a bank account type, a financial institution's RTN, a contact name, a contact address, a contact phone number, an industry activity, or other business-related items.

In one or more embodiments of the invention, more data from the employer may be needed (Step 203) to verify and authenticate the employer's identity, as well as enroll the employer with one or more agencies. For example, an employer may enter its EIN into the business management system. The business management system may perform a check to determine whether more information is needed (Step 203). If more information is needed, the employer may be prompted for more data. For example, the employer may be asked to provide the state(s) of employment for its employees. Once the additional data is obtained (Step 201), the employer's entry in the employer data repository may be updated with the extra information (Step 205). On the other hand, the entered data may expire within a set period of time. For example, the data may only be valid for the duration of the employer's session with the business management system. As a result, the employer-entered data may not be stored in the employer data repository due to the temporary nature of the session.

A determination is made regarding the employer's enrollment in a particular agency (Step 207). The determination may be influenced by several factors, including enrollment rules in the rules repository, the data entered by the employer, and preferences of the employer. For example, if the employer is eligible for electronic filing of its federal tax returns, the employer may choose to enroll in electronic filing, or the employer may prefer to file its federal tax returns on paper. On the other hand, if the employer is required to enroll in electronic filing of its federal taxes, the business management system may proceed automatically with enrolling the employer in electronic filing with the Internal Revenue Service. Enrollment in an agency may also be triggered by an update in the enrollment rules and/or an update in the employer's data. For example, if the employer's business has grown to over $50 million in assets, the employer may automatically be enrolled in electronic filing of federal taxes because the employer is now required to electronically file its federal taxes.

To enroll the employer with an agency, the agency is accessed through a customized interface (Step 209). As mentioned above, the customized interface allows the business management system to transmit and receive data with the agency in a recognized format. In addition, the customized interface may be accessed through a network connection. The employer's data is also transmitted through the customized interface (Step 211) to the agency. In one or more embodiments of the invention, the enrollment rules in the rules repository determine what data is needed by the agency to enroll the employer. Consequently, the data transmitted to the agency is based on the enrollment rules stored in the rules repository.

Enrollment credentials are received by the business management system (Step 213). The enrollment credentials may include a personal identification number (PIN) of the employer, a user identification (user ID), a password, and/or other information that uniquely identifies the employer within the agency. In one or more embodiments of the invention, the employer's enrollment with the agency is confirmed upon receipt of the enrollment credentials. The enrollment credentials may be transmitted instantaneously to the business management system by the agency, or the enrollment credentials may be mailed directly to the employer. The employer may then enter the enrollment credentials into the business management system in order to access any enrollment features through the business management system. For example, the employer may enroll in electronic filing of federal taxes. The IRS may process the enrollment and mail a PIN to the employer. In order to electronically file federal taxes from the business management system, the employer may need to enter the PIN into the business management system.

The employer may also enroll in other agencies (Step 207). As mentioned before, enrollment in other agencies may depend on the employer's data, the employer's preferences, enrollment rules, and any changes the employer's data, preferences, and/or enrollment rules. The employer may enroll with additional agencies through the business management system (Step 209-213) until all requirements and/or preferences are met. Conversely, the employer may only enroll with one agency, or none at all, after entering data into the business management system.

Figure 3:
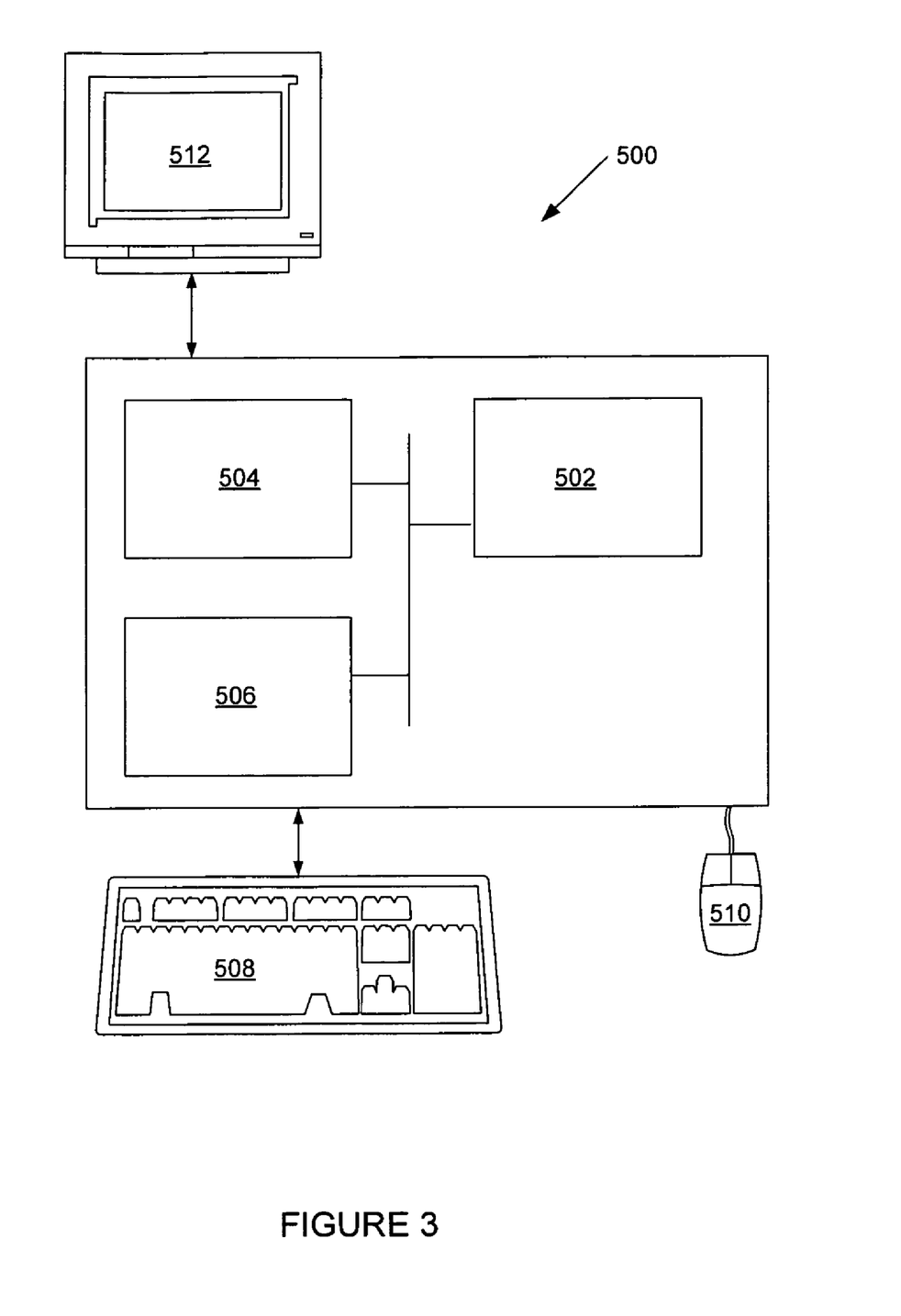
FIG. 3 shows a computer system in accordance with one or more embodiments of the invention.

The invention may be implemented on virtually any type of computer regardless of the platform being used. For example, as shown in FIG. 3, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., business management system, employer interface, agencies, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method for enrolling an employer, comprising:
    receiving, by an intermediary server, a plurality of enrollment criteria from a plurality of government agencies;
    obtaining, by the intermediary server and after receiving the plurality of enrollment criteria, an employer data item comprising at least one selected from a group consisting of a number of employees employed by the employer and a dollar amount of an asset owned by the employer, wherein the intermediary server is separate from the employer, and wherein the intermediary server is separate from the plurality of government agencies;
    determining, by the intermediary server and by comparing a first enrollment criterion of a first government agency with the employer data item, the employer is required to enroll with the first government agency;
    determining, by the intermediary server and by comparing a second enrollment criterion of a second government agency with the employer data item, the employer is eligible to enroll with the second government agency;
    displaying an indication that the employer is required to enroll with the first government agency and that the employer is eligible to enroll with the second government agency;
    mapping, after determining the employer is required to enroll and by the intermediary server, a plurality of employer data items into a format recognized by the first government agency using an interface associated with the first government agency;
    transmitting, by the intermediary server and before the employer is enrolled with the first government agency, the plurality of employer data items in the format to the first government agency to enroll the employer with the first government agency; and
    receiving, by the intermediary server and in response to transmitting the plurality of employer data items, an employer enrollment credential from the first government agency confirming enrollment of the employer with the first government agency,
    wherein the plurality of enrollment criteria includes the first enrollment criterion and the second enrollment criterion, and
    wherein the plurality of government agencies includes the first government agency and the second government agency.

2. The method of claim 1, wherein the plurality of employer data items are obtained from a previous agency enrollment of the employer.

3. The method of claim 1, wherein the employer enrollment credential is at least one selected from a group consisting of a personal identification number (PIN), a user identification (user ID), and a password.

4. The method of claim 1, wherein the employer enrollment credential is used to file a tax return of the employer.

5. The method of claim 1, wherein the employer enrollment credential is used to pay a contribution to the first government agency.

6. The method of claim 5, wherein the contribution is at least one selected from a group consisting of a tax of the employer, insurance payment, and membership fee of the employer.

7. The method of claim 1, wherein the plurality of employer data items are selected from a group consisting of an employer name, an employer social security number, a business name, a business location, an employer identification number (EIN), an employee social security number, an employee name, an employee address, an employee wage, an organization type, an employer type, an employer account number, an unemployment insurance rate, a bank account number, a bank account type, a routing transit number (RTN), a contact name, a contact address, a contact phone number, and an industry activity.

8. The method of claim 1, wherein the first government agency is at least one selected from a group consisting of a federal tax agency, a state tax agency, a local tax agency, and a social security agency.

9. A system for enrolling an employer, comprising:
an employer data repository storing an employer data item comprising at least one selected from a group consisting of a number of employees employed by the employer and a dollar amount of an asset owned by the employer;
a rules repository storing a plurality of enrollment criteria received from a plurality of government agencies;
an identity management system operatively connected to the employer data repository and the rules repository, and comprising a processor executing software instructions to:
generate a first comparison by comparing a first enrollment criterion of a first government agency with an employer data item;
determine, by comparing a first enrollment criterion of a first government agency with the employer data item, the employer is required to enroll with the first government agency;
determine, by comparing a second enrollment criterion of a second government agency with the employer data item, the employer is eligible to enroll with the second government agency;
display an indication that the employer is required to enroll with the first government agency and that the employer is eligible to enroll with the second government agency;
transmit, before the employer is enrolled with the first government agency, a plurality of employer data items to the first government agency to enroll the employer with the first government agency; and
receive, in response to transmitting the plurality of employer data items to the first government agency, an employer enrollment credential from the first government agency confirming enrollment of the employer with the first government agency; and
an interface associated with the first government agency and configured to:
map, before the plurality of employed data items are transmitted to the first government agency, the plurality of employer data items into a format recognized by the first government agency,
wherein the plurality of enrollment criteria includes the first enrollment criterion and the second enrollment criterion,
wherein the plurality of government agencies includes the first government agency and the second government agency,
wherein the identity management system is separate from the plurality of government agencies, and
wherein the identity management system is separate from the employer.

10. The system of claim 9, wherein the plurality of employer data items are obtained from a previous agency enrollment of the employer.

11. The system of claim 9, wherein the employer enrollment credential is at least one selected from a group consisting of a personal identification number (PIN), a user identification (user ID), and a password.

12. The system of claim 9, wherein the employer enrollment credential is used to file a tax return of the employer.

13. The system of claim 9, wherein the employer enrollment credential is used to pay a contribution to the first government agency.

14. The system of claim 13, wherein the contribution is at least one selected from a group consisting of a tax of the employer, insurance payment, and membership fee of the employer.

15. The system of claim 9, wherein the plurality of employer data items are selected from a group consisting of an employer name, an employer social security number, a business name, a business location, an employer identification number (EIN), an employee social security number, an employee name, an employee address, an employee wage, an organization type, an employer type, an employer account number, an unemployment insurance rate, a bank account number, a bank account type, a routing transit number (RTN), a contact name, a contact address, a contact phone number, and an industry activity.

16. The system of claim 9, wherein the first government agency is at least one selected from a group consisting of a federal tax agency, a state tax agency, a local tax agency, and a social security agency.

17. The system of claim 9, wherein the employer interface comprises:
a data input module configured to obtain the plurality of employer data items from the employer; and
an enrollment module configured to allow the employer to enroll in the first government agency.

18. A non-transitory computer readable medium storing software instructions embodied therein for execution on a computer system to perform a method for enrolling an employer, the method comprising: receiving, by an intermediary server, a plurality of enrollment criteria from a plurality of government agencies; obtaining, by the intermediary server and after receiving the plurality of enrollment criteria, an employer data item comprising at least one selected from a group consisting of a number of employees employed by the employer and a dollar amount of an asset owned by the employer, wherein the intermediary server is separate from the employer, and wherein the intermediary server is separate from the plurality of government agencies; determining, by the intermediary server and by comparing a first enrollment criterion of a first government agency with the employer data item, the employer is required to enroll with the first government agency; determining, by the intermediary server and by comparing a second enrollment criterion of a second government agency with the employer data item, the employer is eligible to enroll with the second government agency; displaying an indication that the employer is required to enroll with the first government agency and that the employer is eligible to enroll with the second government agency; mapping, by the intermediary server and after determining the employer is requirement to enroll, a plurality of employer data items into a format recognized by the first government agency using an interface associated with the first government agency; transmitting, by the intermediary server and before the employer is enrolled with the first government agency, the plurality of employer data items in the format to the first government agency to enroll the employer with the first government agency; and receiving, by the intermediary server and in response to transmitting the plurality of employer data items, an employer enrollment credential from the first government agency confirming enrollment of the employer with the first government agency, wherein the plurality of enrollment criteria includes the first enrollment criterion and the second enrollment criterion, and wherein the plurality of government agencies includes the first government agency and the second government agency.

19. The non-transitory computer readable medium of claim 18, wherein the plurality of employer data items are obtained from a previous agency enrollment of the employer.

20. The non-transitory computer readable medium of claim 18, wherein the employer enrollment credential is at least one selected form a group consisting of a personal identification number (PIN), a user identification (user ID), and a password.

21. The non-transitory computer readable medium of claim 18, wherein the employer enrollment credential is used to file a tax return of the employer.

22. The non-transitory computer readable medium of claim 18, wherein the employer enrollment credential is used to pay a tax of the employer.

23. The non-transitory computer readable medium of claim 18, wherein the plurality of employer data items are selected from a group consisting of an employer name, an employer social security number, a business name, a business location, an employer identification number (EIN), an employee social security number, an employee name, an employee address, an employee wage, an organization type, an employer type, an employer account number, an unemployment insurance rate, a bank account number, a bank account type, a routing transit number (RTN), a contact name, a contact address, a contact phone number, and an industry activity.

24. The non-transitory computer readable medium of claim 18, wherein the first government agency is at least one selected from a group consisting of a federal tax agency, a state tax agency, a local tax agency, and a social security agency.

* * * * *

UNITED STATES PATENT AND TRADEMARK OFFICE
CERTIFICATE OF CORRECTION

| | | |
|---|---|---|
| PATENT NO. | : 8,234,187 B1 | Page 1 of 1 |
| APPLICATION NO. | : 11/700466 | |
| DATED | : July 31, 2012 | |
| INVENTOR(S) | : Jennifer A. Martin et al. | |

It is certified that error appears in the above-identified patent and that said Letters Patent is hereby corrected as shown below:

In Claim 20, Column 13 (line 20), --form-- should be changed to "from".

Signed and Sealed this
Ninth Day of October, 2012

David J. Kappos
*Director of the United States Patent and Trademark Office*